United States Patent

Brocheton et al.

[11] Patent Number: 6,048,812
[45] Date of Patent: Apr. 11, 2000

[54] BROWN GLASS WHICH ABSORBS ULTRAVIOLET RADIATION

[75] Inventors: Yves A. H. Brocheton, Fontenay-sous-Bois; Marie J. M. Comte, Fontenay Aux Roses, both of France

[73] Assignee: Corning Incorporated, Corning, N.Y.

[21] Appl. No.: 09/051,619

[22] PCT Filed: Dec. 11, 1996

[86] PCT No.: PCT/US96/19723

§ 371 Date: Apr. 14, 1998

§ 102(e) Date: Apr. 14, 1998

[87] PCT Pub. No.: WO97/23422

PCT Pub. Date: Jul. 3, 1997

[30] Foreign Application Priority Data

Dec. 21, 1995 [FR] France .................... 95 15277

[51] Int. Cl.[7] ............... C03C 3/112; C03C 3/083
[52] U.S. Cl. ............... 501/57; 501/59; 501/68; 501/69; 501/70; 501/71; 501/905
[58] Field of Search ............... 501/57, 59, 68, 501/69, 70, 71, 905

[56] References Cited

U.S. PATENT DOCUMENTS

| | | | |
|---|---|---|---|
| 5,145,805 | 9/1992 | Tarumi et al. | 501/78 |
| 5,324,691 | 6/1994 | Tarumi et al. | 501/66 |
| 5,403,789 | 4/1995 | Kerko et al. | 501/65 |
| 5,405,811 | 4/1995 | Kerko et al. | 501/66 |
| 5,422,755 | 6/1995 | Morgan | 501/72 |
| 5,446,007 | 8/1995 | Krashkevich et al. | 501/69 |
| 5,558,942 | 9/1996 | Itoh et al. | 501/71 |
| 5,656,560 | 8/1997 | Stotzel et al. | 501/71 |

*Primary Examiner*—Karl Group
*Attorney, Agent, or Firm*—Angela N. Nwaneri; Milton M. Peterson

[57] ABSTRACT

The invention relates to brown glasses which absorb ultraviolet radiation that are used in the production of ophthalmic sun glasses, and that have the following composition, expressed in wt. %:

| | |
|---|---|
| $SiO_2$ | 59–78 |
| $Al_2O_3$ | 2–6 |
| $B_2O_3$ | 0–3 |
| $Na_2O$ | 7–16 |
| $K_2O$ | 2–9 |
| CaO | 0–7 |
| BaO | 0–12 |
| ZnO | 0–12 |
| $ZrO_2$ | 0–6 |
| $TiO_2$ | 0–6 |
| $MnO_2$ | 0.25–6 |
| $V_2O_5$ | 1–3 |
| $Fe_2O_3$ | 0–1.5 |
| NiO | 0–0.5 |
| CoO | 0–0.1 |
| $Sb_2O_3$ | 0–0.7 |
| $As_2O_3$ | 0–0.7 |
| F | 0.05–1.0 |
| With $MnO_2 + Fe_2O_3 + V_2O_5$ | >1.5 |
| $Al_2O_3 + SiO_2$ | ≧65. |

4 Claims, 1 Drawing Sheet

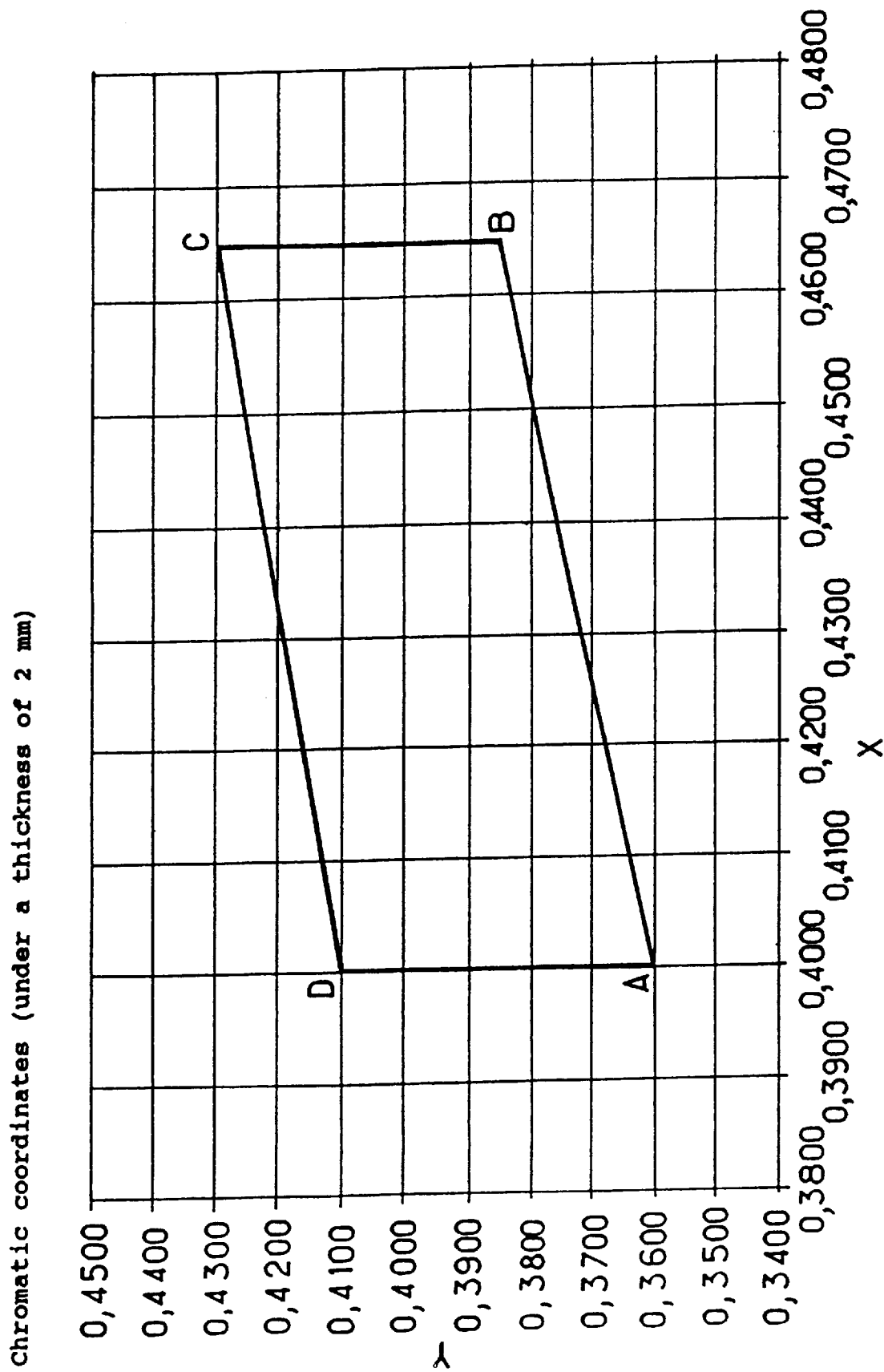

BROWN GLASS WHICH ABSORBS ULTRAVIOLET RADIATION

FIELD OF THE INVENTION

Alkali metal aluminosilicate glasses that contain $V_2O_5$ to absorb ultraviolet radiation, that contain fluorine as an anti-foaming agent, and that contain a combination of colorant oxides to provide a brown color.

The invention relates to brown glasses which absorb ultraviolet radiation. Brown ophthalmic sunglasses have been commercially available for a number of years.

Recently, general awareness has seen the light with regard to the need to better protect oneself from ultraviolet radiation. This is expressed in particular by the concern with improving the filtering of this radiation by glasses intended for ophthalmic sun protection. Commercial glasses fulfilling this function already exist and are essentially based on the ability of iron oxide to absorb ultraviolet radiation when it is in its oxidized form, that is to say in ferric form.

However, the industrial manufacturing of a brown glass containing iron oxide and in which said iron is in the $Fe^{3+}$ form is complicated by the fact that it is necessary to maintain oxidizing conditions during the production of the glass.

Moreover, the UV absorption characteristics of the glasses containing ferric oxide as the UV radiation absorber are not completely satisfactory, particularly with regard to the extent of the range of wavelengths absorbed.

There is consequently a need for brown glasses which absorb UV radiation with improved performance and simpler manufacturing. The invention aims to meet this need.

SUMMARY OF THE INVENTION

More particularly, the invention relates to brown glasses which absorb ultraviolet radiation, which are characterized by the fact that they have the following composition, expressed in wt % based on the oxides:

|  | Broad Range | Preferred Range |
| --- | --- | --- |
| $SiO_2$ | 59–78 | 61–68 |
| $Al_2O_3$ | 2–6 | 3–5 |
| $B_2O_3$ | 0–3 | 0–1.5 |
| $Na_2O$ | 7–16 | 10–15 |
| $K_2O$ | 2–9 | 2–5 |
| CaO | 0–7 | 5–7 |
| BaO | 0–12 | 0–10 |
| ZnO | 0–12 | 0–10 |
| $ZrO_2$ | 0–6 | 0–2 |
| $TiO_2$ | 0–6 | 0–3 |
| $MnO_2$ | 0.25–6 | 1–3.5 |
| $V_2O_5$ | 1–3 | 1–2.5 |
| $Fe_2O_3$ | 0–1.5 | 0–1 |
| NiO | 0–0.5 | 0.1–0.4 |
| CoO | 0–0.1 | 0.0050–0.0500 |
| $Sb_2O_3$ | 0–0.7 | 0–0.5 |
| $As_2O_3$ | 0–0.7 | 0–0.5 |
| F | 0.05–1.0 | 0.1–0.75 |
| With $MnO_2 + Fe_2O_3 + V_2O_5$ | >1.5 | >2.0 |
| $Al_2O_3 + SiO_2$ | ≧65 | ≧65 |

BRIEF DESCRIPTION OF THE DRAWING

The single FIGURE in the accompanying drawing is a graphical representation of chromaticity coordinate x and y, and shows a chromaticity box defining a color area produced in accordance with the present invention.

DESCRIPTION OF THE INVENTION

The glasses of the invention, under a thickness of 2 mm, absorb practically all the UV radiation up to a wavelength of 380 nm and even 400 nm in the case of the preferred glasses.

The color of the glasses of the invention can be adjusted very precisely by a sensible addition of conventional coloring oxides such as NiO, CoO, and others, to the base coloring oxides which $Fe_2O_3$ and $MnO_2$ are. In particular, it is possible to produce glasses which, under a thickness of 2 mm, have a visible light transmission percentage of less than 22%, as is required for applications in the making of sunglasses, and a chromaticity contained inside a polygon ABCDA which is represented in the drawing.

In the single FIGURE in the attached drawing, x chromaticity coordinates are plotted on the horizontal axis, and the y coordinates are plotted on the vertical axis. The elongated polygon ABCDA encompasses coordinate combinations that provide generally acceptable colors in accordance with the invention. The polygon is defined by the following chromatic coordinates:

|  | x | y |
| --- | --- | --- |
| A | 0.4000 | 0.3600 |
| B | 0.4650 | 0.3850 |
| C | 0.4650 | 0.4300 |
| D | 0.4000 | 0.4100 |

Moreover, the visible light transmission spectrum is such that the standards of road signal recognition are met.

The glasses of the invention also have a good resistance to chemical attacks and are compatible with the techniques of chemical tempering currently used for improving the mechanical properties of the glasses.

In the glasses of the invention, the aluminum must be present with a minimum content of 2% to guarantee good chemical durability. For this same reason, the sum of $Al_2O_3 + SiO_2$ must exceed 65%.

The alkali metal oxides facilitate the melting of the glass by lowering its viscosity at high temperature. Moreover, they make it possible to carry out a treatment of chemical tempering of the glass to give it sufficient mechanical resistance for the envisaged application. However, an excessively massive introduction of alkali oxides deteriorates the chemical durability of the glass. We have thus found that it is possible to combine good chemical tempering ability and suitable chemical durability by maintaining the $Na_2O$ and $K_2O$ concentrations in the glass below 16 and 9% respectively.

Zinc oxide can be present in the composition because it promotes chemical tempering of the glass. Its content is preferably lower than 12% to limit the cost of the corresponding raw material.

The optical characteristics of the glasses are determined by the following elements. The absorption of UV-A radiation is essentially ensured by vanadium oxide which must be present with a minimal content of 1%. Transmission in the visible and the color of the glass are adjusted using manganese, vanadium and iron oxides, with individual concentrations not exceeding 6, 3, and 1.5% respectively, and in such a way that their sum is greater than 1.5%.

Conventional coloring oxides, such as NiO, CoO, etc., can also be added to optimize the color. The cobalt and nickel oxide contents are normally maintained below 0.1 and 0.5% respectively, to keep a sufficient transmission level of the glass.

If it is desirable to adjust the refractive index of the glass, the zirconium, titanium, or barium oxides can be used in a conventional manner, individually or combined. BaO does not exceed 12% to maintain a density which is compatible with the envisaged application. $ZrO_2$ will be introduced with a content less than 6% so as not to generate problems of melting of the glass or of devitrifying.

If desired, refining of the glass can be carried out using arsenic oxide, antimony oxide, and/or fluorine. However, fluorine is the preferred refining agent since beyond its refining role, it also prevents untimely foaming of the glass bath at the beginning of melting. We have found that the glasses of the invention are very sensitive to this foaming phenomenon, which can be entirely eliminated by incorporation in the charge of a proportion of fluorine compound giving rise to at least 0.05% F in the composition, and preferably at least 0.1% F. It should be noted that the proportion of F to be added to the charge must generally be higher than these values because of the losses brought about by melting. Depending on the conditions, it is possible to have to add up to double the proportion of F analyzed in the final glass. The fluorine concentration must however be maintained below 1%, beyond which threshold excessive corrosion of the tools for forming the glass is observed.

The antimony and/or arsenic oxides, in addition to their refining action, can be used for another reason, namely their role as buffer for the stabilization of the oxidation-reduction state of the iron and of the manganese, and therefore the regulation of the transmission in the visible and of the color of the glass.

In Table I, the Examples 1 and 3 are according to the invention. Example 2 is outside of the invention. These glasses were obtained by melting in the laboratory, according to the procedure hereafter:

Conventional raw materials in the field of glassmaking technology are precisely weighed and mixed to form a homogeneous vitrifiable mixture. As an example, carbonates can be used as sources of sodium and potassium oxides.

The melting is done in platinum crucibles, at a temperature close to 1450° C., for 3 h.

The glass is then poured into molds in bar form and annealed at 580° C. for one hour, to relax the stresses generated during rapid cooling after melting.

After complete cooling of the glass, the glass is machined into samples 2 mm thick, from which the properties are measured.

Although this procedure is a laboratory procedure, it will be obvious to the expert in the field that greater quantities of glass can also be melted under industrial conditions.

The optical properties reported in Table I are visible light transmission (Y %), the chromatic coordinates (x and y), the wavelength at which the transmission is 1% (UV), the ability to meet the standards of road signal recognition (TSR; for example, the standard ANSI Z 80.3-1986), and the refractive index ($n_d$).

Examples 1 and 3 illustrate the properties which can be obtained from the claimed compositions. These examples are particularly characterized by a transmission in the visible range which is low enough for the applications in the making of sunglasses, trichromatic coordinates inside the limits defined in the preceding, total absorption of UV radiation, and compatibility with the signal recognition standard.

Example 2, although satisfying all the preceding properties, is representative of the foaming phenomenon encountered during the study, when fluorine is absent from the composition in the oven, using a semi-industrial installation. This foaming implies melting difficulties which most of the time result in the presence of variable proportions of bubbles in the glass, making the product commercially unacceptable. For this reason, Example 2 is outside the range of composition claimed in the present invention, in which a minimum fluorine content is required.

TABLE I

|  | 1 | 2 | 3 |
|---|---|---|---|
| $SiO_2$ | 63.8 | 62.3 | 61.8 |
| $B_2O_3$ | — | — | — |
| $Al_2O_3$ | 5 | 5 | 5 |
| $Na_2O$ | 14.3 | 8 | 8 |
| $K_2O$ | 3.1 | 8.8 | 8.8 |
| CaO | 6.1 | — | — |
| BaO | — | 10 | 10 |
| ZnO | 3.5 | — | — |
| $TiO_2$ | 0.3 | — | — |
| $ZrO_2$ | — | — | — |
| $V_2O_5$ | 1.4 | 2.7 | 2.7 |
| $MnO_2$ | 1.5 | 3.1 | 3.1 |
| $Fe_2O_3$ | 0.3 | — | — |
| NiO | 0.17 | 0.1 | 0.1 |
| CoO | 0.0160 | 0.0077 | 0.0077 |
| F | 0.5 | — | 0.5 |
| Y % | 20.6 | 16.2 | 10.2 |
| x | 0.4047 | 0.4286 | 0.4623 |
| y | 0.3988 | 0.3953 | 0.3850 |
| UV (nm) | 386 | 402 | 402 |
| TSR | Yes | Yes | Yes |
| $n_d$ | — | 1.524 | 1.523 |
| Foaming | None | Very Extensive | None |

We claim:

1. Brown glassses which absorb ultraviolet radiation, and have the following composition, expressed in wt %:

| | |
|---|---|
| $SiO_2$ | 59–78 |
| $Al_2O_3$ | 2–6 |
| $B_2O_3$ | 0–3 |
| $Na_2O$ | 7–16 |
| $K_2O$ | 2–9 |
| CaO | 0–7 |
| BaO | 0–12 |
| ZnO | 0–12 |
| $ZrO_2$ | 0–6 |
| $TiO_2$ | 0–6 |
| $MnO_2$ | 0.25–6 |
| $V_2O_5$ | 1–3 |
| $Fe_2O_3$ | 0–1.5 |
| NiO | 0–0.5 |
| CoO | 0–0.1 |
| $Sb_2O_3$ | 0–0.7 |
| $As_2O_3$ | 0–0.7 |
| F | 0.05–1.0 |
| With $MnO_2$ + $Fe_2O_3$ + $V_2O_5$ | >1.5 |
| $Al_2O_3$ + $SiO_2$ | ≧65. |

2. Glasses according to claim 1, have the following composition, expressed in wt %:

| | |
|---|---|
| $SiO_2$ | 61–68 |
| $Al_2O_3$ | 3–5 |
| $B_2O_3$ | 0–1.5 |
| $Na_2O$ | 10–15 |
| $K_2O$ | 2–5 |
| CaO | 5–7 |
| BaO | 0–10 |

-continued

| | |
|---|---|
| ZnO | 0–10 |
| ZrO$_2$ | 0–2 |
| TiO$_2$ | 0–3 |
| MnO$_2$ | 1–3.5 |
| V$_2$O$_5$ | 1–2.5 |
| Fe$_2$O$_3$ | 0–1 |
| NiO | 0.1–0.4 |
| CoO | 0.0050–0.0500 |
| Sb$_2$O$_3$ | 0–0.5 |
| As$_2$O$_3$ | 0–0.5 |
| F | 0.1–0.75 |
| With MnO$_2$ + Fe$_2$O$_3$ + V$_2$O$_5$ | >2.0 |
| Al$_2$O$_3$ + SiO$_2$ | ≧65. |

3. Glasses according to claim 1 or 2, that have chromatic coordinates inside a polygon ABCD which is defined by the following chromatic coordinates:

| | x | y |
|---|---|---|
| A | 0.4000 | 0.3600 |
| B | 0.4650 | 0.3850 |
| C | 0.4650 | 0.4300 |
| D | 0.4000 | 0.4100. |

4. Glasses according to any one of claims 1 to 3, that, under a thickness of 2 mm, have a visible light transmission of less than 22%.

* * * * *